United States Patent [19]
Yamauchi

[11] Patent Number: 5,729,302
[45] Date of Patent: Mar. 17, 1998

[54] METHOD AND APPARATUS FOR DETECTING MOTION VECTORS OF PIXEL BLOCKS OF A DIGITIZED VIDEO SIGNAL

[75] Inventor: Tatsuo Yamauchi, Tokyo, Japan

[73] Assignee: Oki Electric Industry Co., Ltd., Tokyo, Japan

[21] Appl. No.: 306,919

[22] Filed: Sep. 16, 1994

[30] Foreign Application Priority Data

Sep. 17, 1993 [JP] Japan .................. 5-231539
May 13, 1994 [JP] Japan .................. 6-099699

[51] Int. Cl.⁶ .......................................... H04N 7/18
[52] U.S. Cl. ............... 348/699; 348/700; 348/415; 348/416
[58] Field of Search .................. 348/699, 700, 348/416, 411, 402, 405, 419

[56] References Cited

U.S. PATENT DOCUMENTS

| | | |
|---|---|---|
| 4,937,666 | 6/1990 | Yang . |
| 5,126,841 | 6/1992 | Tanaka et al. .................. 348/416 |
| 5,151,784 | 9/1992 | Lavagetto et al. .................. 348/699 |
| 5,153,719 | 10/1992 | Ibenthal . |
| 5,291,563 | 3/1994 | Maeda .................. 348/699 |
| 5,327,232 | 7/1994 | Kim .................. 348/699 |
| 5,351,095 | 9/1994 | Kerdranvat .................. 348/699 |
| 5,369,449 | 11/1994 | Yukitake et al. . |
| 5,371,539 | 12/1994 | Okino et al. . |
| 5,398,078 | 3/1995 | Masuda et al. .................. 348/699 |
| 5,400,076 | 3/1995 | Iwamura .................. 348/416 |
| 5,410,356 | 4/1995 | Kikuchi et al. . |
| 5,436,674 | 7/1995 | Hirabayashi et al. .................. 348/699 |
| 5,442,407 | 8/1995 | Iu .................. 348/620 |
| 5,450,126 | 9/1995 | Nishida .................. 348/699 |
| 5,489,949 | 2/1996 | Jeong et al. .................. 348/699 |

FOREIGN PATENT DOCUMENTS

| | | |
|---|---|---|
| 55-162683 | 6/1979 | Japan . |
| 55-162684 | 6/1979 | Japan . |
| 60-158786 | 1/1984 | Japan . |
| 62-206980 | 3/1986 | Japan . |
| 04-78286 | 7/1990 | Japan . |

Primary Examiner—Amelia Au
Assistant Examiner—Anand Rao
Attorney, Agent, or Firm—Rabin, Champagne, & Lynt, P.C.

[57] ABSTRACT

A motion detector and a motion area detector detect shifts of areas at which motions exist by using signals of fields before and after the field to be detected. According to shifts of the detected areas, an initial vector closest to the true motion is selected among prospective initial vectors produced at an initial vector selector or an initial vector detector by a block matching method, thereby reducing detection errors in motion vectors occurring at a time of the detection of motion vectors, and thereby improving accuracy of motion vectors, so that image distortions would be reduced in an interpolating process.

35 Claims, 12 Drawing Sheets

(A) PREVIOUS FIELD    (B) PRESENT FIELD (A) PREVIOUS FIELD    (B) PRESENT FIELD $V$ : TRUE MOTION VECTOR $(\alpha_0+\alpha_1, \beta_0+\beta_1)$
$V_0$ : INITIAL VECTOR $(\alpha_0, \beta_0)$
$V_1$ : MOTION SHIFT VECTOR $(\alpha_1, \beta_1)$ (A) (B) (C) (D) (E) (F)

(G)

METHOD AND APPARATUS FOR DETECTING MOTION VECTORS OF PIXEL BLOCKS OF A DIGITIZED VIDEO SIGNAL

CROSS-REFERENCE TO RELATED APPLICATION

This application claims the priority benefits of Japanese application No. 5-231539, filed Sep. 17, 1993 and Japanese application No. 6-099699, filed May 13, 1994, the entire disclosures of which are incorporated herein by reference.

BACKGROUND OF THE INVENTION

1. Field of the Invention

This invention relates to a method and an apparatus for detecting a direction and a magnitude of motion of a moving object, or namely, for detecting motion vectors, in a digitized video signal.

2. Description of Related Art

The television system is one of image telecommunications for transmitting visual information such as various scenes and pictures to remote viewers using optical and electrical means. The television system fundamentally converts on its transmitter side a three dimensional image into a two-dimensional (plain) image by a lens, transmits optical energy of respective parts of the image in a form which has been converted into a one-dimensional electrical signal, and composes it again on the system's receiving side to a two-dimensional image to form a picture. In television, plural pictures are consecutively displayed, thereby reproducing movement of objects in the picture. Each of the plural pictures being continuously transmitted is called a frame.

The image and the picture composed from the image are assumed as an assembly of tiny blinks (pixels) having luminance values that are different from one another. In such a television system, a picture is divided into matrixes of tiny blinks on the transmitter side, and then, the luminance of each blink in the picture is converted into an electrical signal according to a fixed order from the left to the right and from the top to the bottom and is transmitted to the receiving side. The electric signal is sequentially composed on the receiving side as pictures according to its order as sent from the transmitting side. Such regularly decomposing or composing of one picture is called scan or scanning.

Scanning is typified to a sequential scanning, or a non-interlace scanning, and to by an interlaced scanning. In non-interlaced scanning, one picture is completed by scanning sequentially from the top to the bottom of the picture. In the interlaced scanning, scanning of a picture is completed by scanning twice, namely, by first scanning the picture with space between scan lines from the top to the bottom and next scanning the between spaces at which the first scanning lines did not proceed. The interlaced scanning can be said to form one fine picture, or the frame, by substantially superimposing plural rough pictures. Each of the plural rough pictures is called a field. The interlaced scanning can reduce the CFR (critical flicker frequency) of the picture without impairing its resolution. Therefore, most television cameras now use the interlaced scanning.

A motion vector indicates a magnitude and a direction of a moving object in a scene. This motion vector is used, for example, for interframe coding during a high efficiency coding of a television signal and for a field interpolation for a field number conversion, as a required process for television standard conversions. A method, generally called a pattern matching method, in which motion vectors are detected using similarity of signal patterns between frames, has been known as a motion vector detecing method. Such a method has been disclosed in Japanese Unexamined Patent Publication Nos. Showa 55-162,683 and Showa 55-162,684. In addition to it, a method, generally called an iterative gradient method, in which motion vectors are presumed, for example from physical correspondence of a signal gradient in a frame or an interframe signal difference value, has been known and disclosed in Japanese Unexamined Patent Publication No. Showa 60-158,786. A method using initial vectors among the iterative gradient methods improves its detection accuracy of detection of the motion vectors, and is disclosed in Japanese Unexamined Patent Publication Nos. Showa 62-206,980 and Heisei 4-78,286.

Even with such a motion vector detecting method in which shift vectors are calculated based on a detected motion vector such as an initial vector and of the initial vector and the shift vector are summed to obtain a true motion vector, however, detection errors may occur due to initial vectors' incapability of response to a sudden change of the motion vector when the object suddenly moves from its still state or when it suddenly stops from its moving state. In particular, with a method having low accuracy of detection of the motion vectors, likewise the gradient method, sudden changes of the motion vectors induce occurrences of detection errors.

For example, as shown in FIG. 1(A), where an object M which had been still in the picture of the previous field travels in the present field, a background image of the moved object M comes to appear at the hatching area in FIG. 1(B). If the background image is the still picture or has no change between two successive fields, the motion vector for this area must be null. However, the detection result of the motion vector cannot in fact be null. As a result, image distortion may occur in an interpolated image in this area. Although the prospective initial vectors of a block m1 showing the object M are produced using the detected motion vector, all the prospective initial vector becomes null because the image in FIG. 1(A) is the still picture one at all. With this gradient method to be used for such a situation, since only an area at which the image gradient exists allows the operation, detection errors may occur upon detection of motion vectors for the block m1 in FIG. 1(B).

Where a moving object m2 from the previous field shown in FIG. 2(A) to the present field shown in FIG. 2(B) in the picture is tiny and moves greatly, detection errors in detecting the motion vector may occur in the gradient method in principle. In contrast, where the background is the motion picture, or has changes between two successive fields, and a nearly still object in detecting a small area exists therein, detection errors of the motion vectors occur similarly. For example, where a TV camera takes pictures of a volley ball game and when the camera is panned along with the motion of the moving volley ball, the background moves whereas the volley ball itself makes the still image. If the movement of the background is great, it affects the data necessary when the still image of the volley ball is corrected using the motion vectors, resulting in occurrences of image distortions.

FIG. 3 shows this example, in which a small ball A is viewed as a still picture portion and a background B moves with a motion mount V. Where the ball size is almost equal to a block size for motion vector detection (in FIG. 3, a block size is set to 8 pixels×8 lines), the full magnitude of the initial vector in the block A becomes a motion amount V for it uses the already detected motion vector. Consequently, a shift vector of −V magnitude must be generated to make the block A still, or namely, to make the motion vector null. However, if the magnitude V is so great, the shift vector of −V does not tend to be generated where, as with the gradient method, the motion vectors are detected with low accuracy, so that the motion vector of A does not become null.

Furthermore, regarding an image having a small vertical correlation likewise a crosshatching pattern, a problem arises in which detection errors easily occur when vertical motion vector Vy is detected. Moreover, where, likewise a TV standard converting apparatus, an interpolated image is produced using the detected motion vectors, the detection errors of such motion vectors produce image distortions.

SUMMARY OF THE INVENTION

It is an object of the invention to reduce detection errors of motion vectors occurring when detecting the motion vectors and to improve accuracy of such motion vectors.

The foregoing object is accomplished with a method of detecting motion vectors, in which a horizontal motion vector is detected from the correlation of the interlaced video signal between the successive fields and in which a vertical motion vector is detected from the correlation of the interlaced video signal between successive frames, in order to reduce detection errors occurring in the event that the vertical motion vector changes greatly, when motion vectors are detected in interlacing pictures.

In another aspect of the invention, in order to reduce motion vector detection errors obtained out of areas suddenly changed from a motion picture to a still picture, a detecting method detects the areas suddenly changed from the motion picture to the still picture and alters its priority order for such areas so that a null motion vector and prospective initial vectors based on the detected motion vector in the present field are easily selected.

In yet another aspect, in order to reduce detection errors occurring in the detection of motion vectors obtained out of transition areas suddenly changed from a motion picture to a still picture or from a still picture to a motion picture, a detecting method, while utilizing the detected motion vectors as much as possible, detects the motion vectors independently with respect to each block in association with the transition areas at which correlation with the detected motion vector is small.

In a further aspect, in order to reduce detection errors occurring in the detection of motion vectors where the background moves with a large motion vector and an object in a tiny area nearly still exists, a detecting method uses, as plural prospective initial vectors for selection of an initial vector, not only motion vectors produced from the detected motion vector but also motion vectors produced by independently detecting motion vectors with respect to each block.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

Figure 4:
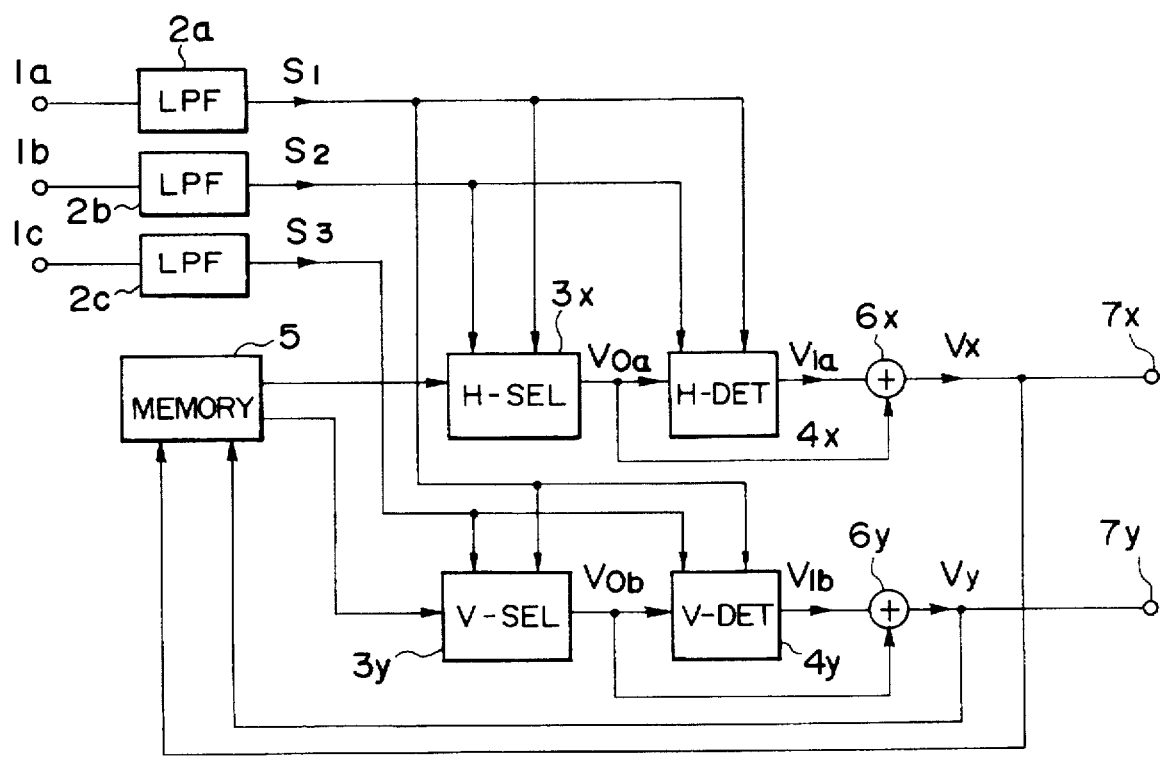
FIG. 4 is a block diagram illustrating a first embodiment of the invention.

Referring to the drawings in detail, in particular, to FIG. 4, a method and apparatus for detecting motion vectors according to a preferred embodiment of the invention is shown. This embodiment has an object to reduce detection errors occurring when vertical motion vectors change greatly at a time that the motion vectors are detected from interlaced pictures.

Where the motion vectors are detected from the interlaced pictures, detection errors tend to occur at a time of the detection of a vertical motion vector Vy for an image, likewise a crosshatching pattern, which has a small vertical correlation, because the motion vectors are detected through comparison of signals between fields. To solve this problem, the motion vectors may be detected between frames. However, the motion vectors of the interframe detection would be inaccurate in comparison with the interfield detection due to time expansion of the motions. Vertical motion vectors Vy would be erroneous due to inaccuracy of the motion vectors.

In the first embodiment, motion vectors are detected by the iterative gradient method using of initial vectors. Before the start of the description for the detailed constitution of the embodiment, referring to FIGS. 5 to 7, a method for selecting an initial vector and a method for seeking a true motion vector using the initial vector are described.

The motion vector detecting method according to this embodiment fractionizes one field or one frame of a television signal into block units composed of m-pixels in a horizontal direction and n-lines in a vertical direction (m and n are arbitrary natural numbers) and detects motion vectors with those blocks, each of which is as one unit. This detection in basis of block units is performed sequentially or on the parallel in the order from the left to the right and from the top to the bottom, as well as the television signal.

Figure 5:
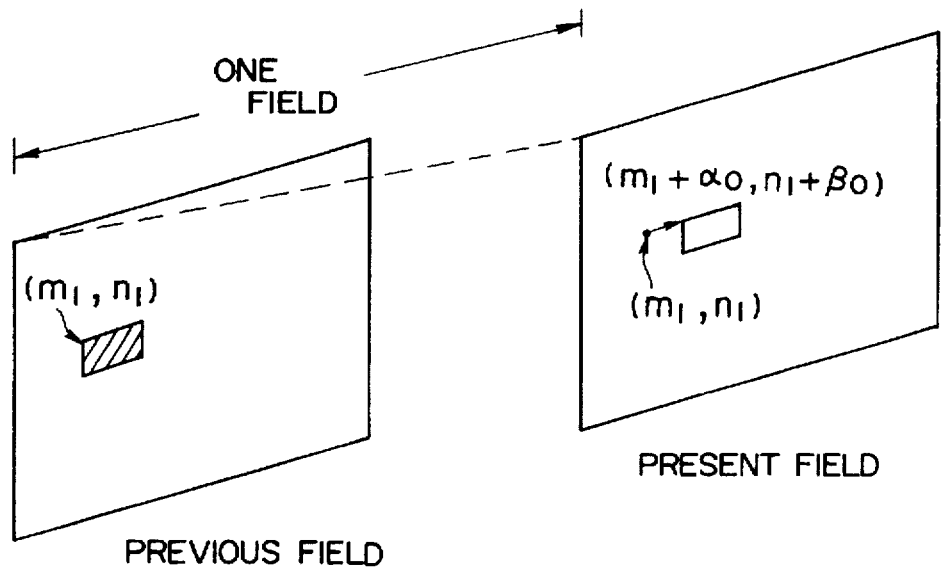
FIG. 5 is a diagram showing a correspondence of blocks in previous and present fields.
Figure 6:
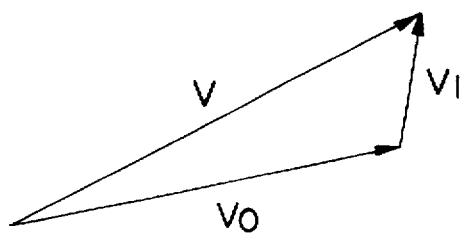
FIG. 6 is a diagram illustrating motion vectors.

As shown in FIG. 5, when a true motion vector is sought for a block to be detected, or a target block (m1, n1), the optimum motion vector is selected from among the motion vectors previously detected, and the selected motion vector is rendered as an initial vector V0 {=($\alpha$0, $\beta$0)}. Then, using the iterative gradient method, a motion shift vector V1 {=($\alpha$1, $\beta$1)} is sought based on the block (m1+$\alpha$0, n1+$\beta$0) at which the coordinates are shifted by a magnitude of the initial vector and based on the target block. A true motion vector V {=V0+V1} for the target block is sought by adding the initial vector V0 and the motion shift vector V1 as shown in FIG. 6. It is to be noted that a pattern matching method or the like can be used as well as the iterative gradient method described above to detect the motion shift vector V1.

The detected motion vector is used for the selection of the initial vector V0 as described above, but in order to improve accuracy of the initial vector V0, it is ideal to select the optimum motion vector from a plurality of the previously detected vectors. However, because of the relation with a circuit scale, a simulation result given by a computer, and whatever, a motion vector selecting method selecting out of six kinds motion vectors as described below is used in this embodiment. These six kinds of motion vectors are called prospective initial vectors, and they will be described in detail with the in use of a diagram shown in FIG. 7.

Figure 7:
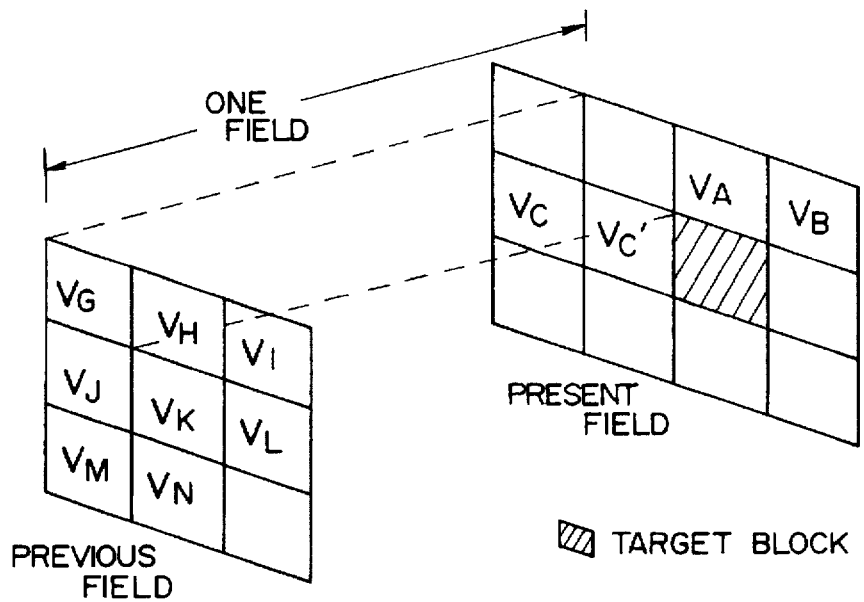
FIG. 7 is a diagram showing kinds of prospective initial vectors.

As shown in FIG. 7, the six motion vectors as cited below 1) to 6) are used as the prospective initial vectors in order to seek the motion vector of the target block, which is shown with the hatching in the present field.

1) A motion vector VA for a block located immediate above the in the present field.

2) A motion vector VB for a block located on a right upper side of the target block in the present field.

3) A motion vector VC for a block located on a left side of the target block in the present field. (Though the $V_C'$ located on the immediate left side would be preferable for one of the prospective initial vectors, the $V_C$ located one block away is used in the light of the circuit constitution and operation time.)

4) A motion vector $V_N$ for a block located immediately below the block in the previous field corresponding to the target block.

5) An average vector $V_E$ {=($V_G$+$V_H$+$V_I$+$V_J$+$V_K$+$V_L$+$V_M$+$V_N$)/8} representing the average of the motion vectors of the block located at the same position in the previous field as the target block and of its surrounding blocks.

6) An acceleration vector Vg {=$V_E$+($V_E$−$V_P$)} representing the vector's shift based on the average vector $V_E$ and the average vector $V_P$ two fields before.

Based on these prospective initial vectors, six kinds of field signals, in which the coordinates of the target block are shifted, are produced. With respect to each field signal of the six kinds, absolute values of the difference between the field signal and a signal located one field or one frame away, are sought and are accumulated to the same number of pixels as the number of the pixels in the target block. One prospective initial vector whose accumulated value is the minimum is selected among them to be the optimum initial vector V0. In this embodiment, the pixels in the picture are fractionized into blocks of eight pixels and eight lines, and then the motion vector is detected with respect to each block.

A luminance signal S1 of the present field is given from an input terminal 1a to a two-dimensional low pass filter (hereinafter abbreviated as "LPF") 2a; a luminance signal S2 of the previous field is given from an input terminal 1b to a two-dimensional LPF 2b; a luminance signal S3 of the field before the previous field is given from an input terminal 1c to a two-dimensional LPF 2c. The two dimensional LPFs 2a, 2b, 2c remove noises and high frequency components from the given luminance signals S1, S2, S3, respectively. Among the luminance signals S1, S2, S3 respectively processed through the two-dimensional LPFs 2a, 2b, 2c, the luminance signal S1 is fed to initial vector selectors 3x, 3y and shift vector detectors 4x, 4y; the luminance signal S2 is fed to the initial vector selector 3x and the shift vector detector 4x; the luminance signal S3 is fed to the initial vector selector 3y and the shift vector detector 4y. A motion vector memory 5 stores the plural detected motion vectors of blocks adjacent to the target block and produces the prospective initial vectors based on the motion vectors. The memory 5 delivers the plural produced prospective initial vectors to the initial vector selectors 3x, 3y.

The initial vector selector 3x shifts, based on each of the prospective initial vectors provided from the motion vector memory 5, the coordinates of the block, respectively, and calculates the absolute value of the interfield difference value between the present field signal S1 and the previous field signal S2. The selector 3x renders the prospective initial vector whose accumulated absolute difference values becomes the smallest within the block as the optimum initial vector V0a. The shift vector detector 4x detects a motion shift vector V1a using the iterative gradient method from the supplied initial vector V0a, the present field luminance signal S1, and the previous field luminance signal S2. An adder 6x finally sums up the initial vector V0a and the detected motion shift vector V1 a and yields a horizontal motion vector Vx.

The initial shift vector selector 3y shifts, based on the prospective initial vectors provided from the motion vector memory 5, the coordinates of the blocks, respectively, and calculates the absolute value of the difference between the present field luminance signal S1 and the luminance signal S3 of the field before the previous field, or in other words, between one field and another field located two field away or interframe. The selector 3y renders the prospective initial vector whose accumulated absolute value becomes the smallest within the block as the optimum initial vector V0b. The shift vector detector 4y detects a motion shift vector V1b using the iterative gradient method from the supplied initial vector V0b, the present field luminance signal S1, and the luminance signal S3 of the field before the previous field. An adder 6y sums up the initial vector V0b and the detected motion shift vector V1b and yields a vertical motion vector Vy. From those horizontal and vertical motion vectors Vx, Vy separately obtained, a true motion vector V {=(Vx, Vy)} is found and stored in the motion vector memory 5.

Figure 8:
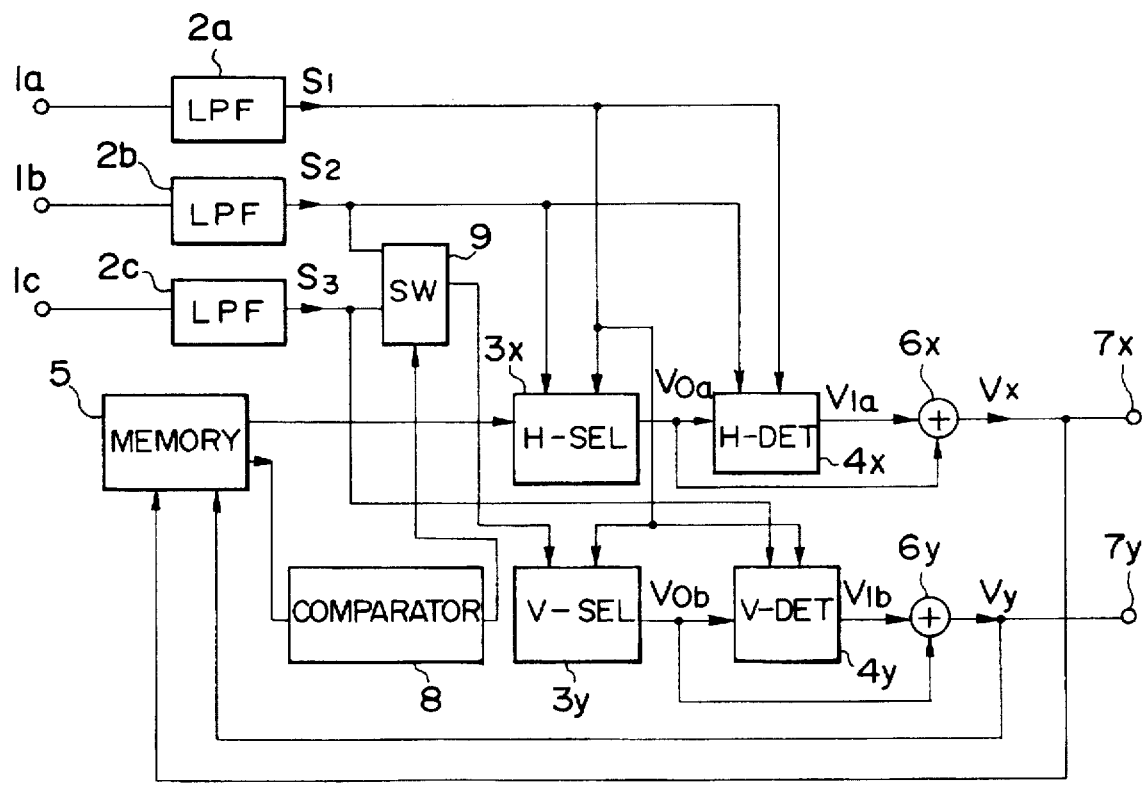
FIG. 8 is a block diagram illustrating a second embodiment of the invention.

FIG. 8 is a block diagram showing constitution of a second embodiment according to the invention; the same numerals are given to the same portions as those of the first embodiment, and those descriptions are omitted. This embodiment, as well as the first embodiment, has an object to reduce detection errors occurring when vertical motion vectors change greatly at a time that the motion vectors are detected from interlaced pictures.

A comparator 8 compares the magnitude of the vertical motion vector of the plural prospective initial vectors supplied from the motion vector memory 5, with a predetermined threshold T1. The threshold T1 can be arbitrarily set in accordance with the specification of the detecting apparatus, images as the objects to be detected, and whatever. In this embodiment, the threshold T1 is set to, for instance, two lines per field. When the magnitude of the prospective initial vector is equal to or less than the threshold T1, the initial shift vector selector 3y for vertical direction detects a vertical motion vector Vy using the signals of the present field and the field before the previous field. When the magnitude of the prospective initial vector is greater than the threshold T1, the initial shift vector selector 3y for vertical direction detects a vertical motion vector Vy using the signals of the present field and the previous field. A switching circuit 9 performs such switching.

The reasons that the second embodiment performs this process for the vertical motion vectors are as follows. When the motion vector is large the detection accuracy would be improved in use of the interfield luminance signals rather than the interframe luminance signals since the motion area would become small. In contrast, when the motion vector is small the detection accuracy would be improved in use of the interframe signals rather than the interfield signals, in an interlaced television signal, because detection accuracy of the motion vectors where the iterative gradient method is used remains to a couple of pixels or lines per one operation of the gradient method.

Although in this second embodiment an initial vector is selected based on the magnitude of the vertical motion vector of the prospective initial vector, it is also possible to select, where vertical motion vectors are detected using an interfield signal and an interframe signal, respectively, either of motion vectors, depending on whether the magnitude of the detected motion vector is greater or less than the predetermined threshold. At that time, although the motion vector to be compared with the threshold can be workable even from the interfield signal or from the interframe signal, it is preferable to use the vertical motion vector using the interframe signal, because its detection accuracy will be higher around the threshold.

According to the first and second embodiments, detection errors in the vertical motion vectors will be reduced during the detection of the motion vectors in the interlaced television signal. Where any of these embodiments is used for an apparatus capable of an interpolation process using such motion vectors, an interpolated image would be therefore produced without any image distortion.

Where the detected motion vectors located around the target block are used as the prospective initial vectors for selection of the initial vector V0, it is presumed that there is the following relation between the selection of the prospective initial vectors and the occurrence of the detection errors. That is, at the area at which the picture changes from a motion picture to a still one, the correlation is not so strong between the detected motion vector of the previous field and the motion vector to be detected of the present field. The detection errors would occur less by selection of the prospective initial vectors based on the null motion vector or the detected motion vector of the present field rather than based on the detected motion vector of the previous field. This phenomena has been confirmed by experiments conducted by the inventor of this invention. Therefore, errors in the motion vectors would be reduced at the area at which the object suddenly changes from a motion state to a still state, if the motion vectors detected in the previous field such as, particularly, the average vector $V_E$ and the acceleration vector $V_G$, among the prospective initial vectors for selection of the initial vector V0, are excluded from the prospective initial vectors, or if they are not easily selected.

A third embodiment is constituted based on the above consideration. That is, the third embodiment reduces the detection errors in the motion vectors by providing a priority order for selection of the initial vector V0 based on changes, in a time scale, of the summation of the absolute values of the interfield or interframe differences of the target blocks, or namely, based on transitions of the still picture areas and the motion picture areas. The apparatus using the third embodiment can be used for apparatuses constituted for detecting motion vectors such as a high efficiency coding apparatus or a television standard conversion apparatus. In this embodiment, the prospective initial vectors of six kinds described in the first embodiment and the null motion vector, that is a total of seven kinds, are used as the prospective initial vectors for selection of the initial vector V0; an iterative gradient method is used for detection of the motion vectors.

Figure 9:
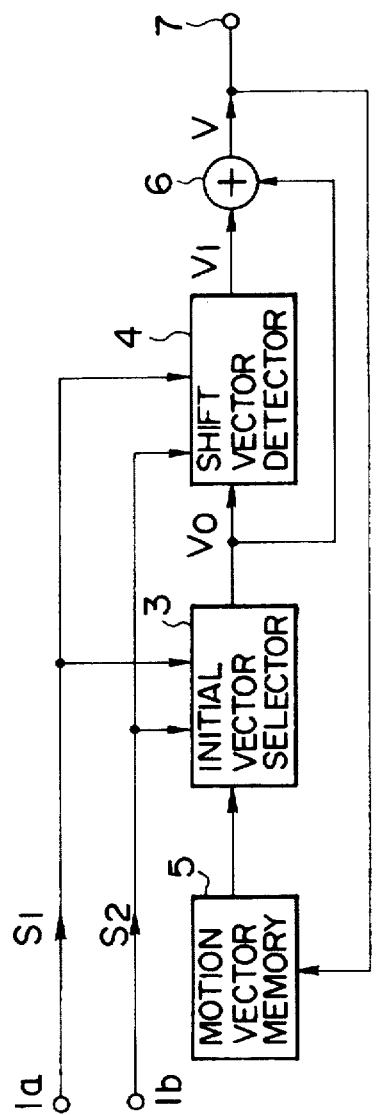
FIG. 9 is a block diagram illustrating a third embodiment of the invention.

The apparatus for implementing the motion vector detecting method is constituted, as shown in a block diagram in FIG. 9, of input terminals 1a, 1b, an initial vector selector 3, a shift vector detector 4, a motion vector memory 5, and an adder 6. The luminance signal S1 of the present field is delivered from the input terminal 1a to the initial vector selector 3 and the shift vector detector 4. The luminance signal S2 of the previous field is also delivered from the input terminal 1b to the initial vector selector 3 and the shift vector detector 4. The motion vector memory 5 is composed of a memory portion for storing the motion vectors of the respective blocks of the present field and a memory portion for storing the motion vectors of the respective blocks of the previous field (one field before). The initial vector selector 3 selects the optimum initial vector V0 from the prospective initial vectors produced based on the detected motion vectors memorized in the motion vector memory 5. The constitution and operation of the initial vector selector 3 will be separately described using FIG. 10. The shift vector detector 4 detects the motion shift vector V1 using the iterative gradient method from the supplied initial vector V0, the present field luminance signal S1, and the previous field luminance signal S2. The adder 6 adds the supplied initial vector V0 with the motion shift vector V1 and obtains a true motion vector V. The obtained true motion vector V is further stored as the detected motion vector in the motion vector memory 5 in order to produce another set of prospective initial vectors in respect to the next target block in the present field or the target block in the successive field (one field after).

Figure 10:
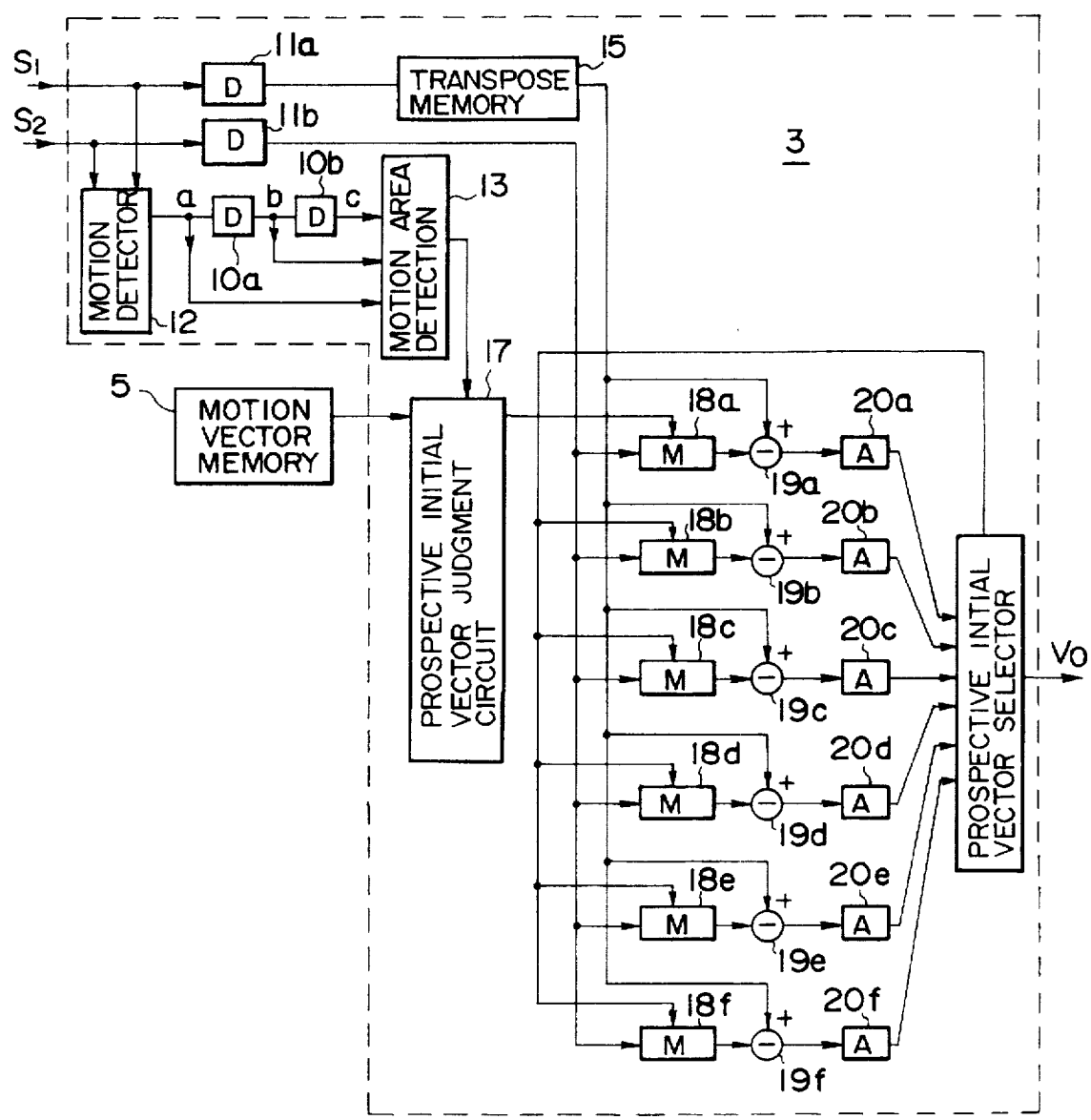
FIG. 10 is a block diagram illustrating an initial vector selector 3 shown in FIG. 9.

FIG. 10 is a block diagram showing the detailed constitution of the initial vector selector 3 in FIG. 9. The luminance signals S1, S2 of the present and previous fields supplied to the initial vector selector 3 pass through the two dimensional LPFs, respectively, and are suspecter interlaced signals by a temporal filter, gravity center correction, or like. Such various filters are omitted from FIGS. 9, 10. These luminance signals S1, S2 are supplied to the motion detector 12. The motion detector 12 is an operation circuit for detecting motions in respect to block units, performs a summation of the absolute values of the difference signals of the present field and the previous field, and, if its result is equal to or less than the threshold T2, delivers a logical high level, or "1", as to indicate that the block is in a still condition. The threshold T2 is arbitrarily set in accordance with the specification of the detecting apparatus, the image as the object to be detected, or the like, and in this embodiment, it is set to, for example, 120, since it is detected on the basis of block units of eight pixels and eight lines.

Figure 1:
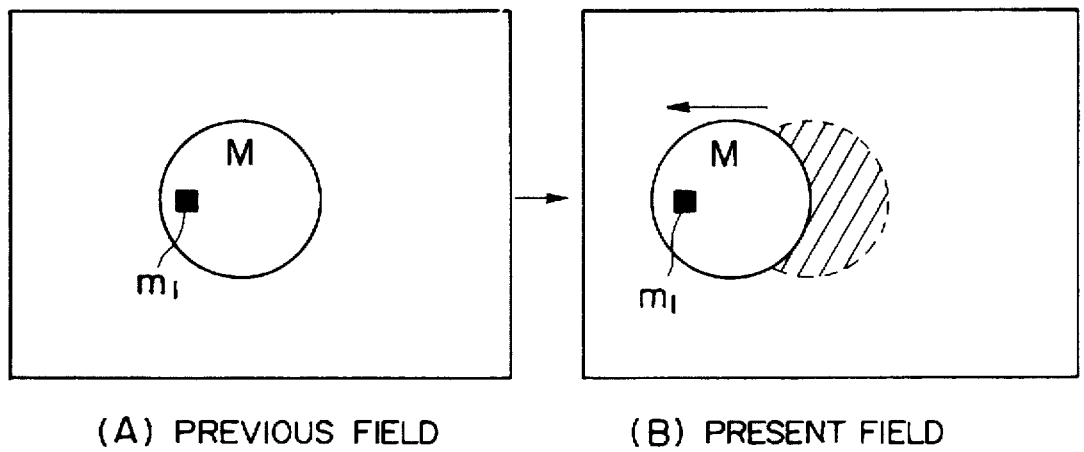
FIG. 1 is a diagram illustrating changes from a still area to a motion area of an image displayed in a picture.
Figure 2:
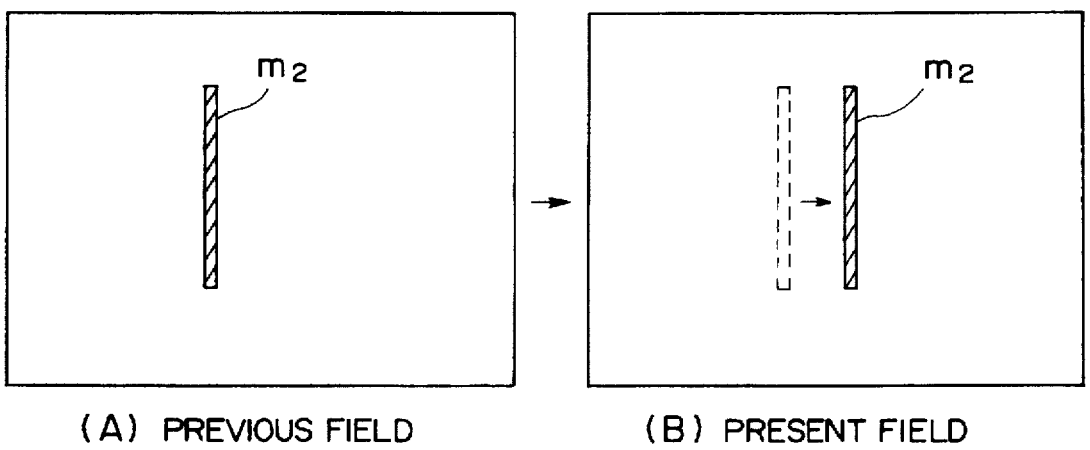
FIG. 2 is a diagram illustrating a small area displayed in a picture at a time that the area moves greatly.
Figure 3:
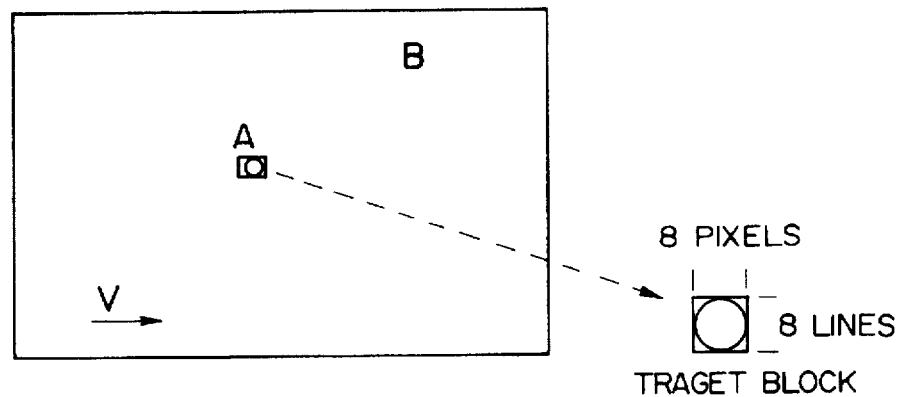
FIG. 3 is a diagram use in explaining for in problems to detecting the motion vectors of a nearly still small area when the area exists within the moving background.

The output of the motion detector 12 is supplied to a motion area detector 13 through nothing or directly, through an one field delay circuit 10a to delay it for one field, and through a pair of one field delay circuits 10a, 10b to delay it for two fields. The motion area detector 13 is a circuit to detect transition areas from the motion picture to the still picture as shown as the hatching portion in FIG. 1(B). For example, regarding the output results of the motion detector 12 supplied to the motion area detector 13, the direct input is assigned a value "a"; the input with one field delay is assigned a value "b"; and the input with two fields delay is assigned a value "c". If (a, b, c)=(1, 0, 0), it indicates that a motion picture has changed to a still picture. The reason for the constitution for detection of the transition areas based on the output results for three fields, as in this embodiment, is to improve the detection accuracy by observing changes of the output results "a" and "c" located before and after the output result "b" as a center. For example, when the detection result is (a, b, c)=(0, 1, 0), it is judged that the change from the motion picture to the still picture detected at the field of "b" was mistakenly detected.

A prospective initial vector judgment circuit 17 for selection of the initial vector V0 supplies a null motion vector to memories 18a to 18f, in lieu of the average vector $V_E$ and the acceleration vector Vg of the previous field among the plural prospective initial vectors, in respect to blocks judged by the motion area detector 13 as in a transition area from the motion picture to the still picture. The motion vector of the block located on the right and lower side of the target block can be supplied even among the motion vectors of the previous field. Even if so, when the direction of the motion vector is from the left to the right or from the top to the bottom, a logical low level "0" is supplied. In addition, the same condition is possible for the surrounding blocks of the target block when the motion vectors detected from the previous field are not used. The luminance signals S1, S2 are separately supplied, respectively, to delay circuits 11a, 11b. The delay circuits 11a, 11b delay the luminance signals S1, S2 for one field +α, respectively. The delay α is an amount to compensate for the delay corresponding to the operation times at the motion detector 12, the one field delay circuits 10a, 10b, and the motion area detector 13. The luminance signal S1 delayed for one field +α through passing the delay circuit 11a is supplied to a transpose memory 15 for line-to-block conversion. This transpose memory 15 converts the scanned signal to block units of m multiplied by n to be read out and delivers them.

The luminance signal S2 delayed for one field +α by passing through the delay circuit 11b is supplied respectively to memories 18a to 18f. The memories 18a to 18f are memories for line-to-block conversion, for shift of the block's coordinates according to the prospective initial vectors of the six kinds, and for reading them out The respective outputs of the memories 18a to 18f are respectively fed to corresponding accumulators 20a to 20f that perform with an absolute value conversion, after the outputs are subtracted from the output of the memory 15 at corresponding subtractors 19a to 19f. The accumulators 20a to 20f accumulate the absolute values of the differences; the accumulated results are supplied to a prospective initial vector selector 21. The prospective initial vector selector 21 delivers as the initial vector V0 a prospective initial vector which gives the smallest value among the accumulated values.

It is also possible to add a fixed value β according to the results of the motion area detector 13 to the outputs of the corresponding accumulators, after the summation of the absolute interfield differences in use of the motion vectors of the previous field, in lieu of the prospective initial vector judgment circuit 17 in FIG. 10 used in this embodiment. As a result, the sum of the accumulated results of the average vector $V_E$ and the acceleration vector Vg of the previous field become large, so that they are not easily selected at the prospective initial vector selector 21. Otherwise, the prospective initial vector judgment circuit 17 in FIG. 10 could be made to judge flexibly to in a certain extent with respect to switching thereof. Moreover, it is also possible that the motion detection result which is detected with respect to each pixel in the target block is used in lieu of the summation of the absolute difference values to judge from the accumulated values. Although in this embodiment the prospective initial vectors of the six kinds described in the first embodiment and the null motion vector, seven kinds in total, are used as the prospective initial vectors and the iterative gradient method is used to detect the motion vectors, it is also possible to use other prospective initial vectors and detecting methods. By constituting as such the embodiment thus described, detection errors will be reduced at the transition area from the still picture to the motion picture where detection errors in the motion vectors conventionally occur, so that occurrence of image distortion will be reduced in the television standard conversion apparatus or the like which performs an interpolation processing in use of the motion vectors.

Figure 11:
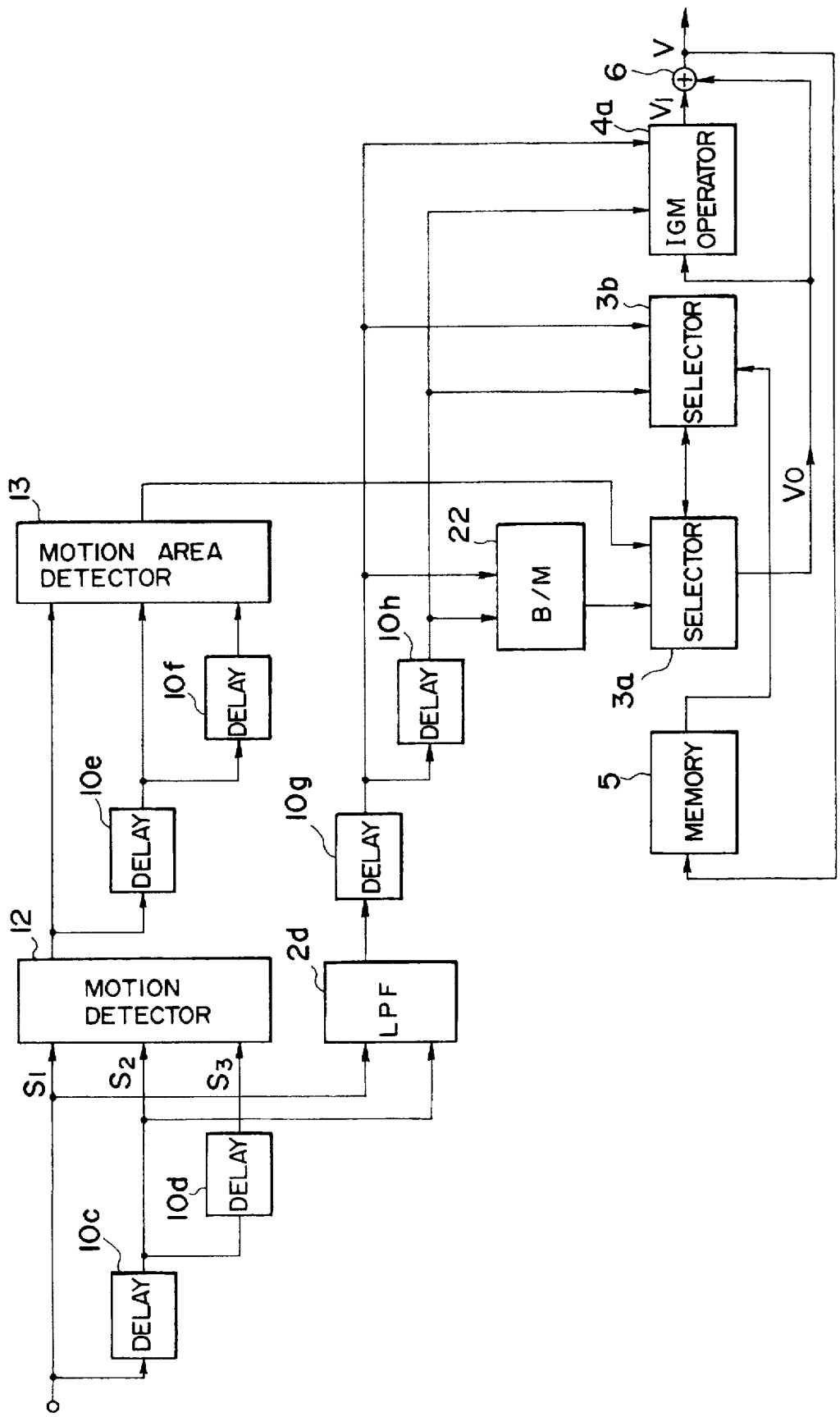
FIG. 11 is a block diagram illustrating a fourth embodiment of the invention.
Figure 12:
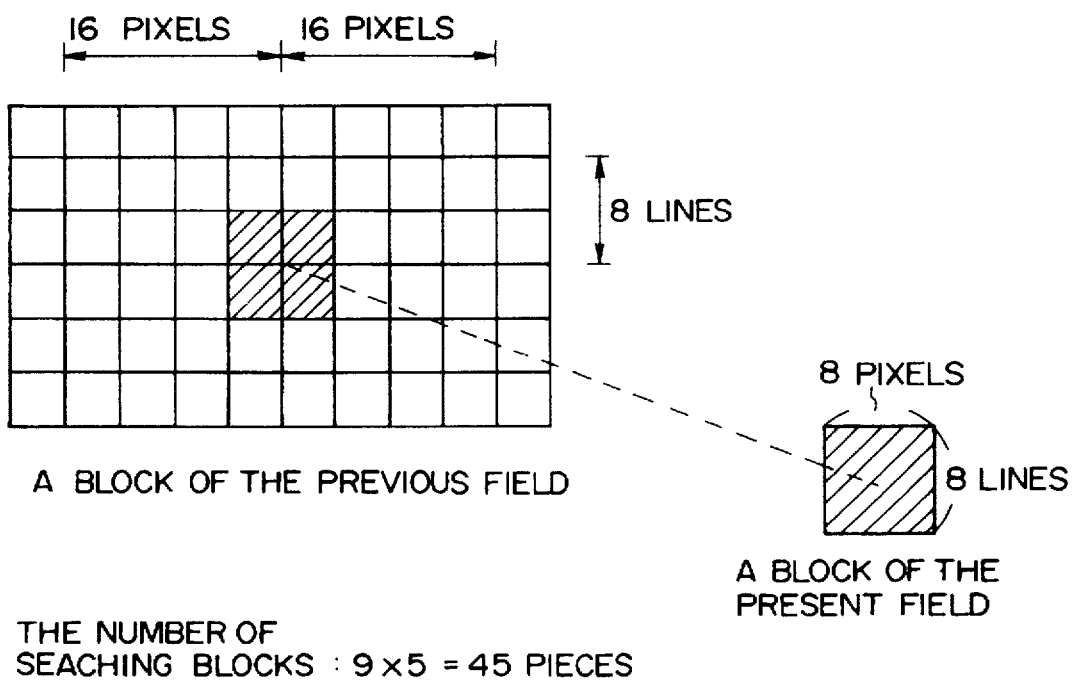
FIG. 12 is a diagram showing a searching range and the number of blocks for a block matching method at a time of selection of initial vectors V0.

FIG. 11 is a block circuit diagram showing the constitution of a fourth embodiment of the invention. In this embodiment, also, the prospective initial vectors of the six kinds described in the first embodiment and the null motion vector, seven kinds in total, are used as the prospective initial vectors for selection of the initial vector V0. Furthermore, as shown in a diagram of FIG. 12, regarding the target block of eight pixels and eight lines in hatching, a total of forty five blocks given by shifting every four pixels and every four line over the range of 20 lines in the vertical direction and 36 pixels in the horizontal direction, are used as reference blocks, and the embodiment is thereby constituted so as to select initial vector V0 by a block matching method. The reference blocks for the block matching method can be given by shifting every single pixel and line. However, for example, where the reference blocks are to be made over the range of 20 lines in the vertical direction and 36 pixels in the horizontal direction, the method requires 720 blocks in total and requires a large hardware constitution. Moreover, since the accuracy of the prospective initial vectors is modified at the succeeding process even if it is more or less coarse, the block is set to every four pixels and every four lines in this embodiment.

For detection of the motion vectors using the constitution shown in the block diagram in FIG. 11, elements such as the two dimensional filter, the temporal filter, or the like, are separately necessary as preprocessing before the detection. However, their descriptions are omitted since they have no direct relation with essential features of this embodiment. The interlaced luminance signal S supplied from the input terminal 1 is supplied to the motion detector 12 via each of three routes. The first route is to supply it from the input terminal 1 directly to the motion detector 12. The second route is to supply it through a delay circuit 10c to the motion detector 12 as the luminance signal S2 delayed for one field. The third route is to supply it through the delay circuit 10c and a delay circuit 10d to the motion detector 12 as the luminance signal S3 delayed for two fields. The motion detector 12 detects the motions using the luminance signals S1, S3 located two fields away, or namely located one frame away from one another. The motion detector 12 detects the motions basically by the difference in values between frames, and its description is herein omitted since it has the same constitution as the third embodiment. The motion signal detected by the motion detector 12 is supplied to the motion area detector 13 through nothing or directly, through a delay circuit 10e for one field delay, and through the delay circuit 10e and a delay circuit 10f for two fields delay in a like manner that the luminance signal S1 is supplied to the motion detector 12 respectively via three routes.

Figure 13:
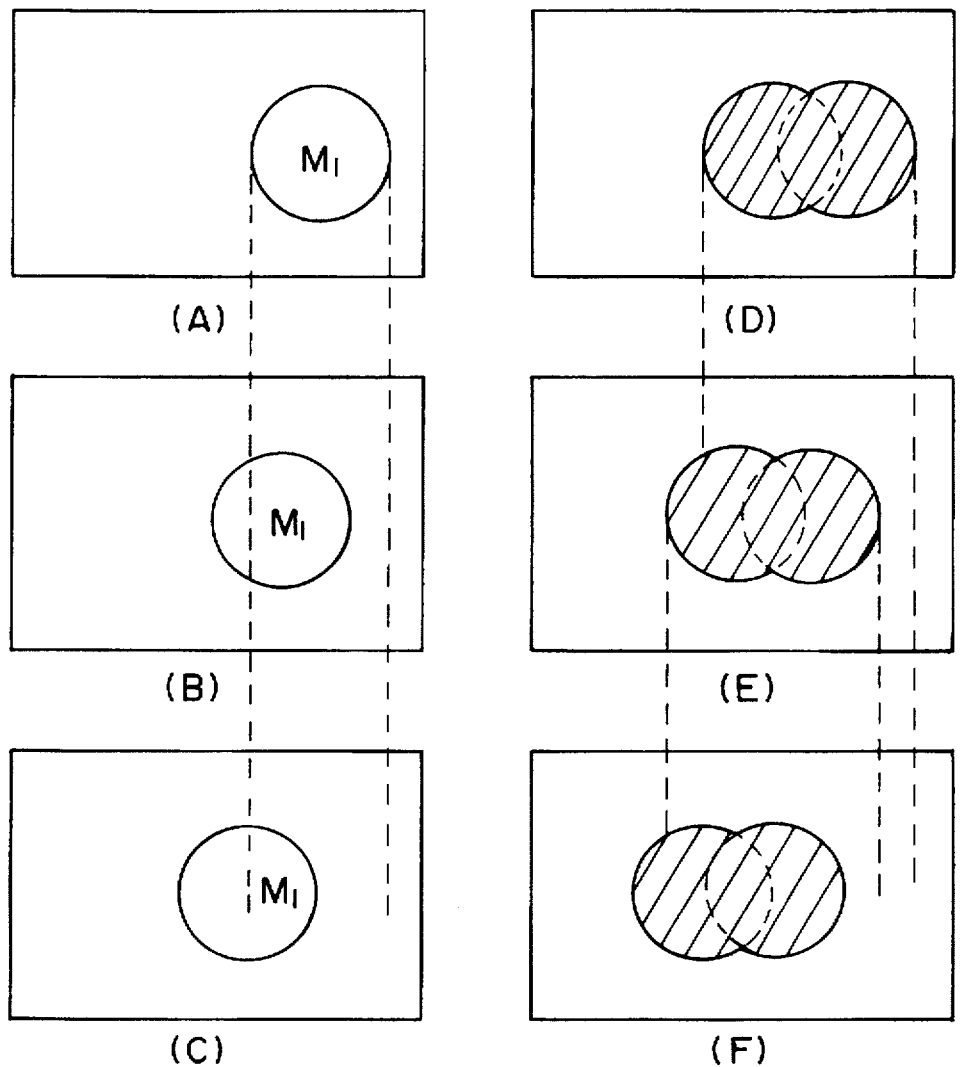
FIG. 13 is a diagram for describing the operation of a motion area detector 13 in FIG. 11.
Figure 13:
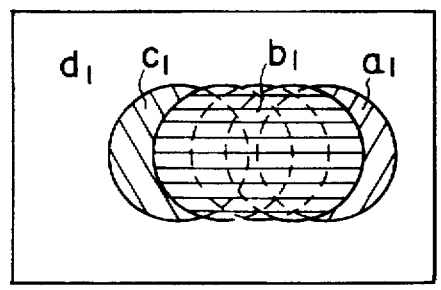

Using diagrams shown in FIGS. 13 (A) to 13 (F), steps for area judgment at the motion area detector 13 will be described. FIG. 13 (A) is a picture based on the input luminance signal S1 supplied to the input terminal 1 in FIG. 11, and it is assumed that in the picture an object M1 has been traveling over the background as the still picture. FIG. 13 (B) is a picture at that time based on an output luminance signal S2 of the delay circuit 10c and is the picture of the previous field with respect to the picture of the luminance signal S1; FIG. 13 (C) is a picture based on an output luminance signal S3 of the delay circuit 10d in FIG. 11 and is the picture of two fields prior to the picture of the luminance signal S1. The motion area is detected by the motion detector 12 based on differences of these pictures. FIG. 13 (D) is a picture based on an output signal of the motion detector 12; the hatched area represents the detected motion area. FIG. 13 (E) is a picture based on an output signal of the delay circuit 10e and shows the motion area of one field before. FIG. 13 (F) is a picture based on an output signal of the delay circuit 10f and shows the motion area of two fields before. The judgment as to what is the motion transition area is made by the motion area detector 13 based on the motion areas sought in FIGS. 13 (D) to 13 (F); FIG. 13 (G) indicates a motion transition area. An area a1 changes from the still picture to the motion picture; an area b1 remains a portion of the motion picture; an area c1 changes from being part of the motion picture to being part of the still picture; and an area d1 remains a portion of the still picture. That is, the area a1 is detectable from FIG. 13 (D) and FIG. 13 (E); the area c1 is detectable from FIG. 13 (E) and FIG. 13 (F). This detection result is fed to the initial vector selector 3a.

The luminance signal S1 supplied to the input terminal 1 is supplied further to the three-dimensional LPF 2d directly and through the delay circuit 10c. The three-dimensional LPF 2d is composed of a horizontal LPF, a vertical LPF, and a temporal LPF, reduces influences of noises and high frequency components, and suppresses occurrences of the detection errors when the motion vectors are detected. The signal delivered from the three-dimensional LPF 2d is fed to an one field delay circuit 10h, an initial vector detector 22, a second initial vector selector 3b, and an iterative gradient method operator 4a after delayed for one field by passing an one field delay circuit 10g. The signal delayed for one field from passing the one field delay circuit 10h is also fed to the initial vector detector 22, the second initial vector selector 3b; and the iterative gradient method operator 4a.

The initial vector detector 22 detects initial vectors by the block matching method using the signals separated one field away from one another. Now, the detection of the initial vectors using the block matching method, is described in detail. The absolute values of the differences between the target block in the present field and each of blocks in the previous field, total 9×5=45 pieces, located in respective positional relations as shown in the diagram in FIG. 12 with respect to the block in the previous field located at the same position as the target block in the present field, are sought, and the block whose summation is the smallest is detected as a first initial vector. The number of the blocks used for the block matching can be less than the case shown in FIG. 12 and conversely can be greater than it. The number of blocks can be determined from the scale of the hardware and the precision of the motion vectors. For example, by assigning eight pixels and eight lines as one block by shifting every eight pixels and every eight lines, the blocks of 15 pieces {=5×3} are possible, but the accuracy of the motion vector becomes at least eight pixels and eight lines in such a case. The detection of the initial vectors at the initial vector detector 22 can be by a method other than the block matching method, and a phase detection method using FFT (Fast Fourier Transform) disclosed in, for example, "G. A. Thomas: Motion Estimation and Its Application to HDTV, SMPTEJ pg 987–992, Dec. 1990" or the like is applicable.

The first initial vector detected by the initial vector detector 22 is supplied to the first initial vector selector 3a. Three data, namely, the motion transition area signal detected at the motion area detector 13, the initial vector detected at the initial vector detector 22, and the second initial vector selected at the second initial vector selector 3b are supplied to the first initial vector selector 3a. The second initial vector selector 3b is to select the optimum as the second initial vector among the initial shift prospective vectors of six kinds produced based on the detected motion vectors stored in the motion vector memory 5. Its constitution is almost the same as that of the initial vector selector 3 in other embodiment described above, so that its detailed description is omitted.

In accordance with the area signal detected at the motion area detector 13, the first initial vector selector 3a performs the following selection.

1) Motion picture area→Still picture area: a null motion vector is set to the initial vector V0.

2) Motion picture area→Motion picture area: the second prospective initial vector based on the detected motion vectors is set to the initial shift vector V0.

3) Still picture area→Motion picture area: the first initial vector detected by the block matching is set to the initial vector V0.

4) Still picture area→Still picture area: a null motion vector is set to the initial vector V0.

When the transition area is detected with respect to each pixel, it is required to convert it into the block units to produce area signals. In this embodiment, as an example, the area signals are counted, and the area signal having the largest number in the block is set as the area signal of the block. For example, if the pixel of the area signal indicating the still area signal is the largest among the sixty four pixels existing in a block composed of eight pixels by eight lines, the block is assigned as the still area.

After the initial vector V0 is thus detected, the shift vector V1 is sought by the iterative gradient method, and a true motion vector V is sought. These detailed description are omitted since they would be almost the same as those of the third embodiment. This embodiment shows the motion vector detecting method in which the motion vectors detected by the block matching method and the motion vectors based on the already detected motion vectors are selected to be used based on the area signal indicating transitions of motions. In addition to such constitution, the motion vector detected by the block matching method can be added to one of the prospective initial vectors of the initial vector selector in use of the already detected motion vectors, and the priority order for selection can be controlled in accordance with the area signal.

In summary of this embodiment detects independently the motion vector with respect to each of the blocks at an area at which the correlation with previously detected motion vectors is scarce while using previously detected motion vectors as much as possible. When the previously detected motion vectors are used, it is desirable to use the motion vectors detected in the field having the same positional relation. That is, in the case of the interlaced scanning, it is desirable to use the motion vectors detected two fields before, or one frame before, rather than one field before. Upon use of this embodiment, it can improve the accuracy of detection of the motion vectors at the area at which the motion changes suddenly, and can significantly reduce enhancements of the circuit scale in comparison with where only the block matching method is used. This effect becomes more apparent as the magnitude of the motion vector to be detected becomes larger.

Figure 14:
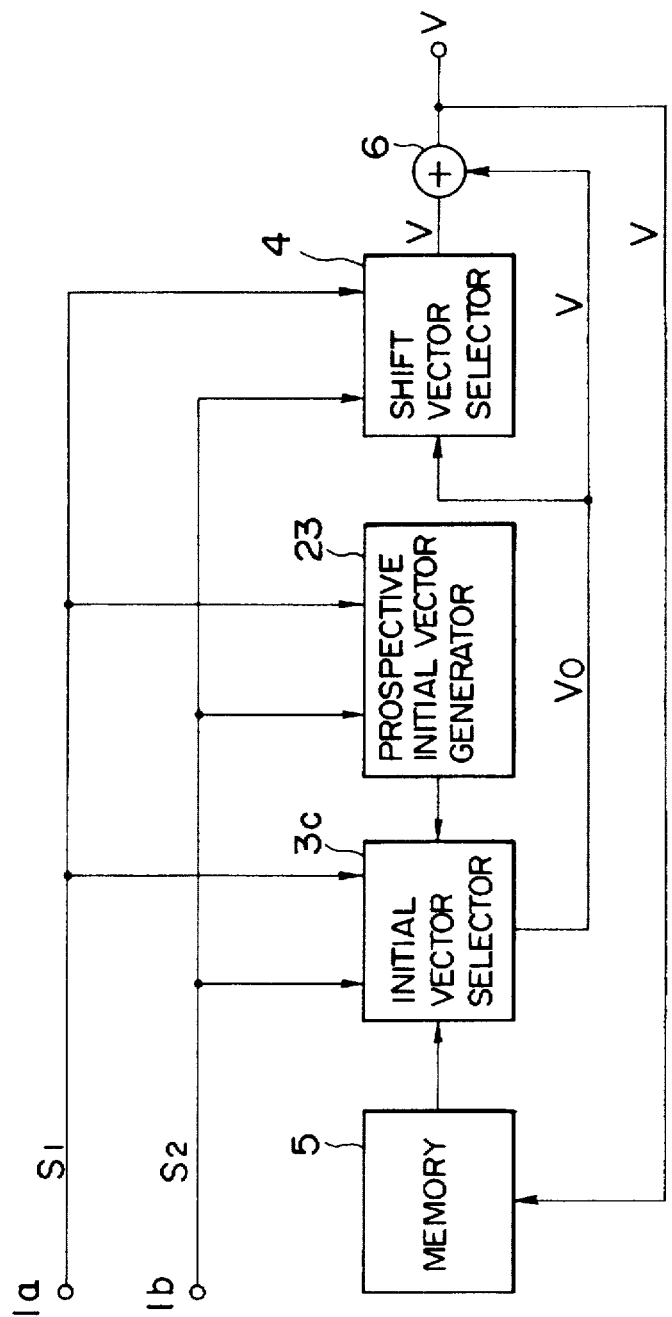
FIG. 14 is a block diagram illustrating a fifth embodiment of the invention.

FIG. 14 is a block diagram showing a structure of a fifth embodiment of the invention. In the fifth embodiment, it is an object to reduce errors in a detection of the motion vectors even when the background moves a large amount and an object of a small area exists nearly in a still condition. To accomplish the object, the embodiment has a constitution that uses not only the motion vectors produced from the previously detected true motion vectors but also motion vectors detected and produced independently from the motion vector of each other block, as one of the prospective initial vectors for selection of the optimal initial vector. The fifth embodiment is also to detect the motion vector by the iterative gradient method using the prospective initial vectors and has a constitution in which the prospective initial vectors of the six kinds described in the first embodiment and the motion vector sought for each block using a block matching method, namely, prospective initial vectors of seven kinds in total, are used as prospective initial vectors for selection of initial vector V0.

An apparatus to implement the motion vector detecting method, as shown in FIG. 14, has a constitution including input terminals 1a, 1b, an initial vector selector 3c, a shift vector detector 4, a prospective initial vector generator 23 using a block matching method, a motion vector memory 5, and an adder 6. Hereinafter, the motion vector detecting method using this apparatus is described. The shift vector detector 4, the motion vector memory 5, and the adder 6 have the same constitution as those of the other embodiments, so that those descriptions are omitted.

Figure 15:
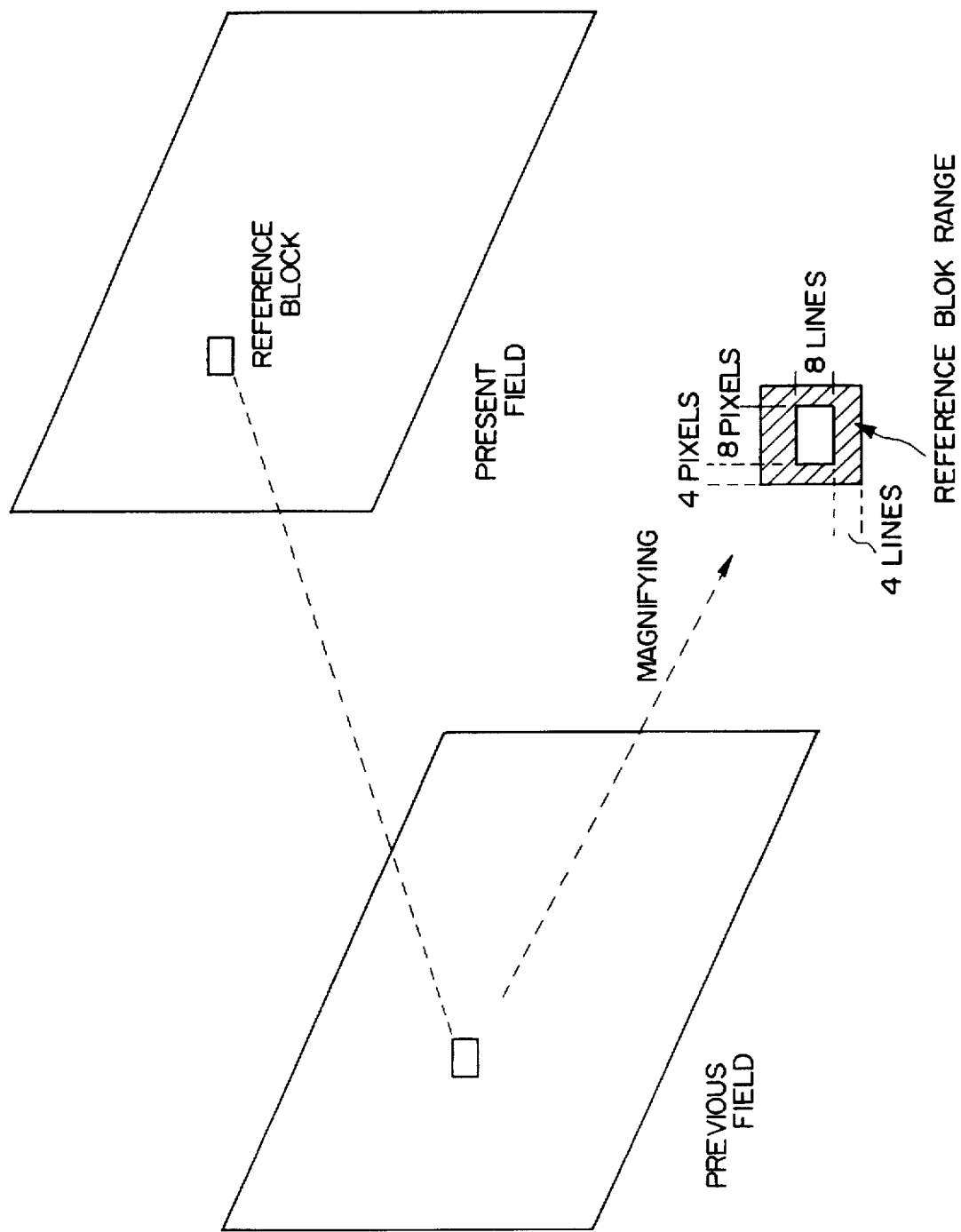
FIG. 15 is a diagram illustrating a motion detecting method by a block matching method.

The luminance signal S1 of the present field is fed from the input terminal 1a to the initial vector selector 3c, the prospective initial vector generator 23 and the shift vector detector 4. The luminance signal S2 of the previous field is also fed from the input terminal 1b to the initial vector selector 3c, the prospective initial vector generator 23 and the shift vector detector 4. The prospective initial vector generator 23 is a circuit to independently detect the motion vectors with respect to each block and to produce the prospective initial vectors VBr. As shown in FIG. 15, the motion vector detecting method uses as reference blocks a total of 81 blocks of the previous field given by shifting the block of 8 pixels and 8 lines by every signal pixel and every signal line over a range of ±4 lines in a vertical direction and ±4 pixels in a horizontal direction in respect to the target block of the present field, to accumulate the absolute values of the differences between those reference blocks and the target block, and to select the reference block having the least accumulation value. Then, the prospective initial vector VBr is produced from the positional shift between the selected reference block and the target block. An initial transition vector selector 3c produces plural prospective initial vectors based on the detected motion vectors stored in the motion vector memory 5. The selector 3c then selects the optimum initial vector V0 among those prospective initial vectors and the prospective initial vectors VBr produced by the prospective initial vector generator 23.

Figure 16:
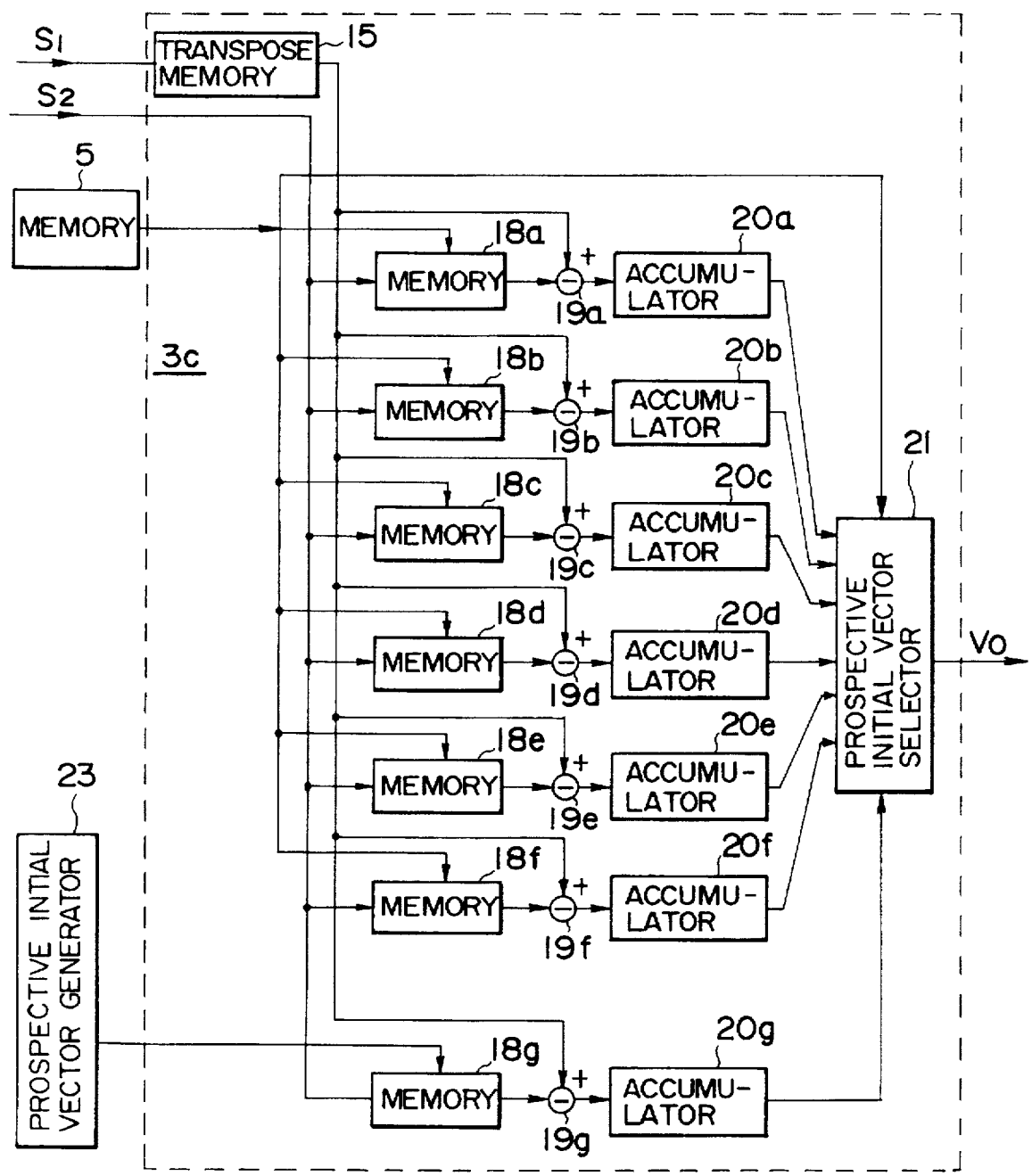
FIG. 16 is a block diagram illustrating an initial vector selector 3c in FIG. 14.

Referring to FIG. 16, the selection of the optimum initial vector V0 will be described. FIG. 16 is a block diagram showing in detail the constitution of the initial vector selector 3c. The luminance signals S1, S2 of the present and previous fields fed to the initial vector selector 3c pass in common two dimensional LPFs. Those signals S1, S2 are signals pseudo-interlaced by means of such as a temporal filter or gravity center corrections. Descriptions of those various filters are omitted. The luminance signal S1 is fed to a transpose memory 15 for line-to-block conversion. The transpose memory 15 for line to block conversion converts the signal scanned in the scanning direction into read-outs of the block units of m multiplied n and delivers them. In contrast, the luminance signal S2 is respectively fed to memories 18a to 18f and 18g of the vector selector 3c. The memories 18a to 18f are memories to perform conversion of line to block, to shift the coordinates of the blocks corresponding to the conventional prospective initial vectors of the six kinds, and to read them out. The memory 18g is a memory to perform conversion of line to block, to shift the coordinates of the blocks corresponding to the prospective initial vector VBr obtained from the prospective initial vector generator 23, and to read them out. The respective outputs of those memories 18a to 18g are fed to corresponding accumulators 20a to 20g having a function of the absolute value conversion to be accumulated while made to be the absolute value, after subtracted from the outputs of the transpose memory 15 for line to block conversion at corresponding subtractors 19a to 19g. The accumulated results are respectively fed to the initial shift prospective selector 21. The initial shift prospective selector 21 selects the motion vector, as the initial vector V0, at which the smallest value is given among the accumulated values.

In this embodiment, although the reference blocks are produced by shifting every single pixel and every single line at a time of the detection of the prospective initial vectors by the block matching method, it is also possible to make the pitch a little larger such as, for example, two pixels and two lines, since the accuracy of the prospective initial vector is modified in the following process even if coarse more or less. Where thus constituted, the embodiment can reduce the number of the reference blocks and can simplify the processes to require for the detection. Moreover, it is also possible to use, as the prospective initial vectors for selection of the initial vector V0, other initial shift prospective vectors than the prospective initial vectors of the six kinds described in the first embodiment.

As described above, upon using the invention, detection errors of the motion vectors occurring when the motion vectors are detected would be reduced, and the accuracy of the motion vectors would be improved. Where an apparatus for producing interpolation images using the detected motion vectors, likewise a television standard conversion apparatus, uses the apparatus for detecting motion vectors according to the invention, occurrence of image distortions due to detection errors of the motion vectors would be reduced.

It is understood that although the present invention has been described in detail with respect to preferred embodiments thereof, various other embodiments and variations are possible to those skilled in the art which fall within the scope and spirit of the invention, and such other embodiments and variations are intended to be covered by the following claims.

What is claimed is:

1. A true motion vector detecting method, including dividing a digitized video signal into plural blocks, producing plural prospective initial vectors from previously detected true motion vectors in respect to said block in which the true motion vector is to be detected in order to detect the true motion vector in respect to each of said blocks between signals located at least one field away from one another, seeking a shift vector based on an optimum vector as an initial vector selected from among said plural prospective initial vectors, and rendering a summation of said initial vector and said shift vector as the true motion vector of said block, said detecting method comprising the steps that:

a) a further prospective initial vector is produced independently of the prospective initial vectors produced from previously detected true motion vectors in respect to each block; and b) said produced motion vector is used along with the plural prospective initial vectors for detecting the true motion vector for said each block.

2. A detecting method of motion vectors as set forth in claim 1, wherein a block matching method is used independently for each block to detect the further prospective initial vector.

3. A true motion vector detecting apparatus, dividing a digitized video signal into plural blocks, producing plural prospective initial vectors from previously detected true motion vectors in respect to said block in which the true motion vector is to be detected in order to detect the true motion vector in respect to each of said blocks between signals located at least one field away from one another, seeking a shift vector based on an optimum vector as an initial vector selected among said plural prospective initial vectors, and rendering a summation of said initial vector and said shift vector as the true motion vector of said block, said apparatus comprising:

a first prospective initial vector generator for producing plural prospective initial vectors from the previously detected motion vector for the block at which a motion vector is to be detected;

a second prospective initial vector generator for producing at least one prospective initial vector from independently detecting a further motion vector in respect to each block; and an initial vector selector for selecting the optimum one among the plural prospective initial vectors produced at said first and second prospective initial vector generators as the initial vector.

4. A detecting apparatus for motion vectors as set forth in claim 3, wherein said second prospective initial vector generator renders the further motion vector detected from a block matching method as the prospective initial vector.

5. A method of producing a true motion vector for each block of each field of a digitized video signal, the digitized video signal being divided into successive fields, each field being subdivided into plural blocks, a block for which a true motion vector in a present field is being currently produced being designatable as a current target block, the true motion vectors being produced representing changes in position of target blocks relative to blocks in fields at least one field away from the present field, the true motion vector for each target block being a sum of an optimum initial vector and a shift vector, the method comprising, for the production of the true motion vector for the current target block, the steps of:

producing plural prospective initial vectors, including
producing a plurality of the prospective initial vectors based on true motion vectors previously obtained for other blocks, and producing another of the plural prospective initial vectors that is independent of any previously obtained true motion vectors;

selecting an optimum initial vector from among the plural prospective initial vectors;

producing a shift vector based on the optimum initial vector; and summing the optimum initial vector and the shift vector to obtain the true motion vector for the current target block.

6. A method of producing a true motion vector according to claim 5, wherein said step of producing another of the plural prospective initial vectors includes producing the another of the plural prospective initial vectors based on a first portion of the digitized signal corresponding to the current target block and a second portion of the digitized signal separated from the first portion by at least one field.

7. A method of producing a true motion vector according to claim 6, further comprising the step of storing each true motion vector in a memory as it is obtained, wherein said step of producing a plurality of the prospective initial vectors based on true motion vectors previously obtained for other blocks includes selecting the prospective initial vectors from among the true motion vectors stored in the memory, outputting the selected prospective initial vectors from the memory, and selecting an optimum initial vector from among the selected prospective initial vectors and the another of the plural prospective initial vectors, based on at least the first and second portions of the digitized signal.

8. A method of producing a true motion vector according to claim 5, further comprising the step of storing each true motion vector in a memory as it is obtained, wherein said step of producing a plurality of the prospective initial vectors based on true motion vectors previously obtained for other blocks includes selecting the prospective initial vectors from among the true motion vectors stored in the memory, outputting the selected prospective initial vectors from the memory, and selecting an optimum initial vector from among the selected prospective initial vectors and the another of the plural prospective initial vectors, based on at least a first portion of the digitized signal corresponding to the current target block and a second portion of the digitized signal separated from the first portion by at least one field.

9. A method of producing a true motion vector according to claim 5, wherein each block consists of a block of pixels.

10. A method of producing a motion vector for each block of each field of a digitized video signal, the digitized video signal being divided into successive fields, each field being subdivided into plural blocks, each block consisting of a block of pixels, a block for which a motion vector in a present field is being produced being designatable as a target block, the motion vectors being produced representing changes in position of target blocks relative to blocks in fields at least one field away from the present field, the motion vector for each target block being a sum of an optimum initial vector and a shift vector, the method comprising, for the production of the motion vector for the target block, the steps of:

producing a set of prospective initial vectors including a plurality of first prospective initial vectors and a second prospective initial vector, including producing the first prospective initial vectors based on motion vectors previously obtained for other blocks, and producing the second prospective initial vector independently of any previously obtained motion vector based on a first portion of the digitized signal corresponding to the target block and a second portion of the digitized signal separated from the first portion by at least one field;

selecting an optimum initial vector from the set of prospective initial vectors based on at least the first and second portions of the digitized signal;

producing a shift vector based on the optimum initial vector and at least the first and second portions of the digitized signal; and summing the optimum initial vector and the shift vector to obtain the true motion vector for the target block.

11. A method of producing a motion vector according to claim 10, further comprising the step of storing each motion vector in a memory as it is obtained, wherein said step of producing a set of the prospective initial vectors includes selecting the first prospective initial vectors from among the motion vectors stored in the memory, outputting the selected prospective initial vectors from the memory, and selecting an optimum initial vector from among the selected prospective initial vectors and the second prospective initial vector, based on at least the first and second portions of the digitized signal.

12. A method of producing a motion vector according to claim 10, wherein said step of selecting an optimum initial vector from the set of prospective initial vectors includes the steps of:

determining whether the target block is in a motion transition area between motion and still areas, based on at least a first portion of the digitized signal corresponding to the target block and a second portion of the digitized signal separated from the first portion by at least one field; and selecting the optimal initial vector either from the first prospective initial vectors or as the second prospective initial vector according to a condition of the transition area.

13. A detecting method of motion vectors as set forth in claim 12, wherein said step of selecting the optimal initial vector includes selection of a null vector if the transition area is an area of transition from a motion area to a still area, and selection of a the second prospective initial vector if the transition area is an area of transition from a still area to a motion area, said step of producing the second prospective initial vector being performed by a block matching method.

14. An apparatus for producing a true motion vector for each block of each field of a digitized video signal, the digitized video signal being divided into successive fields, each field being subdivided into plural blocks, a block for which a true motion vector in a present field is being currently produced being designatable as a current target block, the true motion vectors being produced representing changes in position of target blocks relative to blocks in fields at least one field away from the present field, the true motion vector for each target block being a sum of an optimum initial vector and a shift vector, the apparatus comprising:

means for generating plural prospective initial vectors, including means for generating a plurality of the prospective initial vectors based on true motion vectors previously obtained for other blocks, and means for generating another of the plural prospective initial vectors that is independent of any previously obtained true motion vectors;

means for selecting an optimum initial vector from among the plural prospective initial vectors;

means for producing a shift vector based on the optimum initial vector; and means for summing the optimum initial vector and the shift vector to obtain the true motion vector for the target block.

15. An apparatus according to claim 14, wherein said means for generating another of the plural prospective initial vectors includes means for generating the another of the plural prospective initial vectors based on a first portion of the digitized signal corresponding to the current target block and a second portion of the digitized signal separated from the first portion by at least one field.

16. An apparatus according to claim 15, wherein said means for generating a plurality of the prospective initial vectors includes a memory for storing each true motion vector as it is obtained and means for selecting the prospective initial vectors from among the true motion vectors stored in the memory and outputting the selected prospective initial vectors from the memory.

17. An apparatus according to claim 16, wherein said means for selecting an optimum initial vector comprises means for selecting the optimum initial vector based on at least the first and second portions of the digitized signal.

18. An apparatus according to claim 14, wherein said means for generating a plurality of the prospective initial vectors includes a memory for storing each true motion vector as it is obtained and means for selecting the prospective initial vectors from among the true motion vectors stored in the memory and outputting the selected prospective initial vectors from the memory, and wherein said means for selecting an optimum initial vector comprises means for selecting the optimum initial vector based on at least the first and second portions of the digitized signal.

19. An apparatus for producing a motion vector for each block of each field of a digitized video signal, the digitized video signal being divided into successive fields, each field being subdivided into plural blocks, each block consisting of a block of pixels, a block for which a motion vector in a present field is being produced being designatable as a target block, the motion vectors being produced representing changes in position of target blocks relative to blocks in fields at least one field away from the present field, the motion vector for each target block being a sum of an optimum initial vector and a shift vector, the apparatus comprising:

means for generating a set of prospective initial vectors including a plurality of first prospective initial vectors and a second prospective initial vector, including means for generating the first prospective initial vectors based on motion vectors previously obtained for other blocks, and means for generating the second prospective initial vector independently of any previously obtained motion vector based on a first portion of the digitized signal corresponding to the target block and a second portion of the digitized signal separated from the first portion by at least one field;

means for selecting an optimum initial vector from the set of prospective initial vectors based on at least the first and second portions of the digitized signal;

means for generating a shift vector based on the optimum initial vector and at least the first and second portions of the digitized signal; and means for summing the optimum initial vector and the shift vector to obtain the true motion vector for the target block.

20. An apparatus according to claim 19, wherein said means for generating a plurality of the prospective initial vectors includes a memory for storing each motion vector as it is obtained, wherein said means for generating a set of the prospective initial vectors includes means for selecting the first prospective initial vectors from among the motion vectors stored in the memory and outputting the selected prospective initial vectors from the memory, and means for selecting an optimum initial vector from among the selected first prospective initial vectors and the second prospective initial vector, based on at least the first and second portions of the digitized signal.

21. An apparatus according to claim 19, wherein said optimum initial vector selecting means includes:
 means for determining whether target block is in a motion transition area between motion and still areas, based on at least a first portion of the digitized signal corresponding to the target block and a second portion of the digitized signal separated from the first portion by at least one field, and
 means for selecting the optimal initial vector either from the first prospective initial vectors or as the second prospective initial vector according to a condition of the transition area.

22. An apparatus according to claim 21, wherein said means for selecting the optimal initial vector either from the first prospective initial vectors or as the second prospective initial vector comprises means for selecting as the optimal initial vector a null vector if the transition area is an area of transition from a motion area to a still area, and the second prospective initial vector if the transition area is an area of transition from a still area to a motion area, said means for generating the second prospective initial vector generating the second prospective initial vector by a block matching method.

23. A method of producing a motion vector according to claim 5, wherein said step of producing a plurality of the prospective initial vectors based on true motion vectors previously obtained for other blocks includes producing first prospective initial vectors based on true motion vectors previously obtained for other blocks in the present field.

24. A method of producing a motion vector according to claim 23, wherein said step of producing a plurality of the prospective initial vectors based on true motion vectors previously obtained for other blocks further includes producing second prospective initial vectors based on true motion vectors previously obtained for other blocks in at least one field at least one field away from the present field.

25. A method of producing a motion vector according to claim 5, wherein said step of producing a plurality of the prospective initial vectors based on true motion vectors previously obtained for other blocks includes producing at least one of the prospective initial vectors based on true motion vectors previously obtained for at least one other block in at least one field at least one field away from the present field.

26. A method of producing a motion vector according to claim 22, wherein said step of producing plural prospective initial vectors, includes storing the produced plurality of the prospective initial vectors in a memory; and said step of selecting an optimum initial vector includes selecting the optimum initial vector from among the stored plurality of prospective initial vectors and the produced another of the plural prospective initial vectors, after said step of storing.

27. A method of producing a motion vector according to claim 10, wherein said step of producing the first prospective initial vectors based on motion vectors previously obtained for other blocks includes producing a plurality of the first prospective initial vectors based on motion vectors previously obtained for other blocks in the present field.

28. A method of producing a motion vector according to claim 27, wherein said step of producing the first prospective initial vectors based on motion vectors previously obtained for other blocks further includes producing further prospective initial vectors based on motion vectors previously obtained for other blocks in at least one field at least one field away from the present field.

29. A method of producing a motion vector according to claim 27, wherein the first prospective initial vectors includes six prospective initial vectors, said step of producing first prospective initial vectors includes storing the produced six prospective initial vectors in a memory; and said step of selecting an optimum initial vector includes outputting all of the plurality of prospective initial vectors from the memory and selecting the optimum initial vector from among the output plurality of prospective initial vectors and the second prospective initial vector.

30. An apparatus according to claim 14, wherein said means for of generating a plurality of the prospective initial vectors based on true motion vectors previously obtained for other blocks includes means for generating first prospective initial vectors based on true motion vectors previously obtained for other blocks in the present field.

31. An apparatus according to claim 30, wherein said means for generating a plurality of the prospective initial vectors based on true motion vectors previously obtained for other blocks further includes means for generating second prospective initial vectors based on true motion vectors previously obtained for other blocks in at least one field at least one field away from the present field.

32. An apparatus according to claim 30, wherein the plurality of prospective initial vectors includes six prospective initial vectors, means for generating the plurality of prospective initial vectors includes a memory for storing the produced six prospective initial vectors; and said means for selecting an optimum initial vector includes means for outputting all of the plurality of prospective initial vectors from the memory and means for selecting the optimum initial vector from among the output plurality of prospective initial vectors and the another of the plural prospective initial vector.

33. An apparatus according to claim 19, wherein said means for generating the first prospective initial vectors based on motion vectors previously obtained for other blocks includes means for generating a plurality of the first prospective initial vectors based on motion vectors previously obtained for other blocks in the present field.

34. An apparatus according to claim 33, wherein said means for generating the first prospective initial vectors based on motion vectors previously obtained for other blocks further includes means for generating further prospective initial vectors based on motion vectors previously obtained for other blocks in at least one field at least one field away from the present field.

35. A method of producing a motion vector according to claim 33, wherein the first prospective initial vectors includes six prospective initial vectors, said means for generating the first prospective initial vectors includes a memory for storing the produced six prospective initial vectors; and said means of selecting an optimum initial vector includes means for outputting all of the plurality of prospective initial vectors from the memory and selecting the optimum initial vector from among the output plurality of prospective initial vectors and the second prospective initial vector.

* * * * *

UNITED STATES PATENT AND TRADEMARK OFFICE
CERTIFICATE OF CORRECTION

PATENT NO.       : 5,729,302                                  Page 1 of 1
APPLICATION NO.  : 08/306919
DATED            : March 17, 1998
INVENTOR(S)      : Tatsuo Yamauchi It is certified that error appears in the above-identified patent and that said Letters Patent is hereby corrected as shown below:

Title Page, Item 56 (References Cited)

Please add the following to the list of References Cited under U.S. Patent Documents:

-- 5,189,518  2/1993  Nishida
   5,557,341  9/1996  Weiss et al. ........... 348/461
   5,508,744  4/1996  Savatier................. 348/699
   5,594,504  1/1997  Ebrahimi............... 348/699 --

Please add the following to the list of References Cited under Foreign Patent Documents:

-- 0 549 471A1  6/1993  European --

Signed and Sealed this

Twenty-second Day of May, 2007

JON W. DUDAS
*Director of the United States Patent and Trademark Office*